(12) United States Patent
Moubarak et al.

(10) Patent No.: US 12,387,390 B2
(45) Date of Patent: Aug. 12, 2025

(54) METHOD, SYSTEM AND COMPUTER PROGRAM PRODUCT FOR VISUAL REPRESENTATION OF AN INCIDENT SCENE

(71) Applicant: MOTOROLA SOLUTIONS, INC., Chicago, IL (US)

(72) Inventors: Michel Moubarak, Chelsea (CA); Pawel Jurzak, Cracow (PL); Jacqueline Mazzeo, New York, NY (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 190 days.

(21) Appl. No.: 18/488,104

(22) Filed: Oct. 17, 2023

(65) Prior Publication Data

US 2025/0124610 A1   Apr. 17, 2025

(51) Int. Cl.
| | |
|---|---|
| G06F 3/048 | (2013.01) |
| G06F 3/0481 | (2022.01) |
| G06F 3/04845 | (2022.01) |
| G06T 11/00 | (2006.01) |
| G06T 13/00 | (2011.01) |

(52) U.S. Cl.
CPC ............ *G06T 11/00* (2013.01); *G06F 3/0481* (2013.01); *G06F 3/04845* (2013.01); *G06T 13/00* (2013.01); *G06T 2200/24* (2013.01)

(58) Field of Classification Search
CPC ..... G06T 11/00; G06T 13/00; G06T 2200/24; G06F 3/0481; C06F 3/04845
See application file for complete search history.

(56) References Cited

U.S. PATENT DOCUMENTS

| | | | |
|---|---|---|---|
| 6,043,813 A | 3/2000 | Stickney et al. | |
| 9,691,189 B1* | 6/2017 | Creath | G06Q 10/06 |
| 9,721,302 B2* | 8/2017 | Tofte | G06Q 40/08 |
| 10,373,387 B1* | 8/2019 | Fields | H04L 67/025 |
| 10,387,962 B1* | 8/2019 | Potter | G06Q 40/08 |
| 10,419,312 B2 | 9/2019 | Alazraki | |
| 10,719,966 B1* | 7/2020 | Davis | G06T 11/60 |
| 11,954,315 B1* | 4/2024 | Megyese | G06F 30/15 |
| 2004/0103008 A1 | 5/2004 | Wahlbin et al. | |
| 2018/0176474 A1* | 6/2018 | Blanco | G06T 11/60 |
| 2018/0268305 A1 | 9/2018 | Dhondse et al. | |
| 2019/0057286 A1* | 2/2019 | Woulfe | H04N 21/23418 |
| 2021/0370180 A1* | 12/2021 | Carraway | A63F 13/497 |
| 2022/0155909 A1* | 5/2022 | Kawashima | G06F 3/0487 |

(Continued)

OTHER PUBLICATIONS

Jones et al., Identifying Corroborated and Contradicted Claims Among Witness Statements using Post-Hoc Collective Intelligence, 2018, IEEE, 6 pages (Year: 2018).*

*Primary Examiner* — Linh K Pham

(57) ABSTRACT

A method, system and computer program product for visual representation of an incident scene is disclosed. The method includes generating, using an at least one processor, a set of inputs for causing an at least one learning machine to create, for display on a screen, a visual representation of the incident scene corresponding to witness statements. The visual representation includes depictions of a plurality of scene elements. The method also includes providing the set of inputs to the at least one learning machine to cause the at least one learning machine to create the visual representation of the incident scene.

18 Claims, 3 Drawing Sheets

(56) References Cited

U.S. PATENT DOCUMENTS

| | | |
|---|---|---|
| 2022/0269887 A1 | 8/2022 | Chee et al. |
| 2022/0414377 A1 | 12/2022 | Siedlik et al. |
| 2023/0419377 A1* | 12/2023 | Garbos ................... G06T 17/00 |
| 2024/0312144 A1* | 9/2024 | Perumalla ............. G06T 19/006 |
| 2025/0111457 A1* | 4/2025 | Subrahmanian ....... G06Q 50/18 |

\* cited by examiner

METHOD, SYSTEM AND COMPUTER PROGRAM PRODUCT FOR VISUAL REPRESENTATION OF AN INCIDENT SCENE

BACKGROUND

In situations where there are multiple witnesses to an incident, it is common for each witness to have differing or inconsistent recollections of aspects of a scene, description(s) of individual(s) at the scene, etcetera. Understanding meaningful differences between witness statements may be difficult and time consuming, and it may not be easy for an interrogator to quickly notice what differences are important, in efforts to dig deeper.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
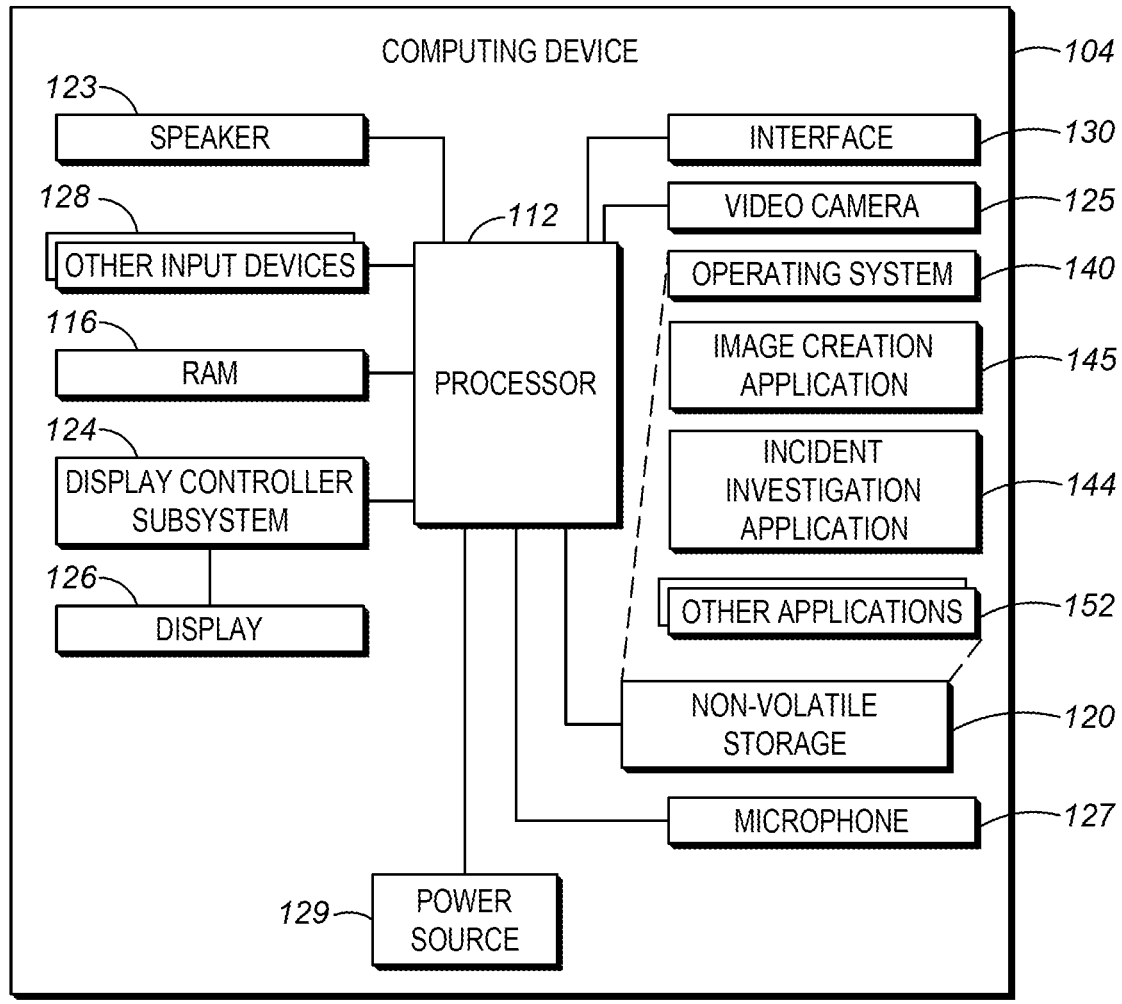
FIG. 1 is a block diagram of a computing device in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method that includes employing at least one processor to access a plurality of witness statements that describe an incident scene that includes a plurality of scene elements. A first scene element of the scene elements is described consistently across the witness statements. A second scene element of the scene elements is described inconsistently across the witness statements. The computer-implemented method also includes generating, using the at least one processor, a set of inputs for causing an at least one learning machine to create, for display on a screen, a visual representation of the incident scene corresponding to the witness statements and including depictions of the first scene element and the second scene element. The computer-implemented method also includes providing the set of inputs to the at least one learning machine to cause the at least one learning machine to create the visual representation of the incident scene. The depiction of the second scene element includes a visual effect to distinguish the second scene element from the first scene element based on the first scene element being consistently described across the witness statements, as contrasted to the second scene element being inconsistently described across the witness statements.

In accordance with another example embodiment, there is provided a system that includes at least one processor and a display screen communicatively coupled to the at least one processor. The system includes at least one electronic storage medium communicatively coupled to the at least one processor. The at least one electronic storage medium stores program instructions that when executed by the at least one processor cause the at least one processor to perform accessing a plurality of witness statements that describe an incident scene that includes a plurality of scene elements. A first scene element of the scene elements is described consistently across the witness statements. A second scene element of the scene elements is described inconsistently across the witness statements. Execution of the program instructions further causes the at least one processor to perform generating a set of inputs for causing an at least one learning machine to create, for display on the display screen, a visual representation of the incident scene corresponding to the witness statements and including depictions of the first scene element and the second scene element. Execution of the program instructions further causes the at least one processor to perform providing the set of inputs to the at least one learning machine to cause the at least one learning machine to create the visual representation of the incident scene. The depiction of the second scene element includes a visual effect to distinguish the second scene element from the first scene element based on the first scene element being consistently described across the witness statements, as contrasted to the second scene element being inconsistently described across the witness statements.

Each of the above-mentioned embodiments will be discussed in more detail below, starting with example system and device architectures of the system in which the embodiments may be practiced, followed by an illustration of processing blocks for achieving an improved technical method, device, and system for visual representation of an incident scene.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of a computing device 104 within which methods in accordance with example embodiments can be carried out. In some example embodiments, the computing device 104 is a computer system formed of a plurality of separately housed parts communicatively connected to each other; however in other example embodiments the computing device 104 is a computer system that is not necessarily physically implemented in such a manner, and may be a selected one or more of the following: a handheld device such as, for example, a tablet, a phablet, a smart phone or a personal digital assistant (PDA); a laptop computer; a smart television; and other suitable devices. In at least one example embodiment, a portion of the illustrated elements resides in one or more remote servers (for example, in the cloud), and another portion of the illustrated elements resides in one of the above listed devices.

The illustrated computing device 104 includes at least one processor 112 that controls the overall operation of the computing device. The processor 112 interacts with various subsystems such as, for example, random access memory (RAM) 116, non-volatile storage 120, speaker 123, display controller subsystem 124, video camera 125, microphone 127 and other input devices 128 (such as a selected one or more of a keyboard, mouse, touch pad and roller ball, for example). Also, regarding the video camera 125 and the microphone 127, these are optional input devices.

Regarding the display controller subsystem 124, this interacts with display 126, and the display controller subsystem 124 renders graphics and/or text upon the display 126. In some examples, the display 126 may be optionally integrated into a housing of the computing device 104 (any suitable device components like, for instance, the microphone 127, may be optionally integrated into the housing of the computing device 104).

The illustrated computing device 104 also includes a power source 129 which provides operating power within the computing device 104. In some examples, the power source 129 includes one or more batteries, a power supply with one or more transformers, etc. Moreover, it will be understood that many different specific implementations for the power source 129 are possible.

The illustrated computing device 104 also includes interface 130. The interface 130 may include hardware, software, or both providing one or more interfaces for communication (such as, for example, packet-based communication) among the computing device 104, other computing devices similar to the computing device 104, any suitable networks, any suitable network devices, and/or any other suitable computer systems. As an example and not by way of limitation, the interface 130 may include a Network Interface Controller (NIC) or network adapter for communicating with an Ethernet or other wire-based network and/or a Wireless NIC (WNIC) or wireless adapter for communicating with a wireless network. In at least one example consistent with the example embodiment of FIG. 1, the interface 130 may include a USB port to support USB-complaint communications.

In some examples, the interface 130 comprises one or more radios coupled to one or more physical antenna ports. Depending on the example implementation, the interface 130 may be any type of interface suitable for any type of suitable network with which the computing device 104 is used. As an example and not by way of limitation, the computing device 104 can communicate with an ad-hoc network, a Personal Area Network (PAN), a Local Area Network (LAN), a Wide Area Network (WAN), a Metropolitan Area Network (MAN), or one or more portions of the Internet or a combination of two or more of these. One or more portions of one or more of these networks may be wireless. As an example, the computing device 104 may be capable of communicating with a Wireless PAN (WPAN) (such as, for example, a BLUETOOTH WPAN), a WI-FI™ network, a WI-MAX™ network, a Long-Term Evolution (LTE) network, an LTE-A network, a cellular telephone network (such as, for example, a Global System for Mobile Communications (GSM) network), or any other suitable wireless network or a combination of two or more of these. The computing device 104 may include any suitable interface 130 for any one or more of these networks, where appropriate.

In some examples, the interface 130 may include one or more interfaces for one or more external I/O devices. One or more of these external I/O devices may enable communication functionality between a person and the computing device 104 similar and/or complementary to communication functionality provided by, for instance, some examples of the input devices 128 previously described. As an example and not by way of limitation, an external I/O device may be any suitable input or output device, including alternatives more external in nature than other input devices (or output devices) herein mentioned (also, some combination of two or more of these is also contemplated). An external I/O device may include one or more sensors. Particular examples may include any suitable type and/or number of I/O devices and any suitable type and/or number of interfaces 130 for them. Where appropriate, the interface 130 may include one or more drivers enabling the processor 112 to drive one or more of these external I/O devices. The interface 130 may include one or more interfaces 130, where appropriate.

Still with reference to the computing device 104, operating system 140 and various software applications used by the processor 112 are stored in the non-volatile storage 120. The non-volatile storage 120 is, for example, one or more hard disks, solid state drives, or some other suitable form of computer readable medium that retains recorded information after the computing device 104 is turned off. Regarding the operating system 140, this includes software that manages computer hardware and software resources of the computing device 104 and provides common services for computer programs. Also, those skilled in the art will appreciate that the operating system 140, incident investigation application 144, image creation application 145 (described later herein in more detail), and other applications 152, or parts thereof, may be temporarily loaded into a volatile store such as the RAM 116. The processor 112, in addition to its operating system functions, can enable execution of the various software applications on the computing device 104.

Regarding the incident investigation application 144, this can be any suitable application for electronic collection of statements given by witnesses to a particular incident (e.g. a documented incident identifiable by an incident number or some other suitable form of unique identifier). Commercially available examples of the incident investigation application 144 include Pronto EWS™, Donesafe's Incident Management™, etc. In some examples, one or more of the incident investigation application 144 and the image creation application 145 may reside in nonvolatile storage associated with a remote server (for example, in the cloud).

Figure 2:
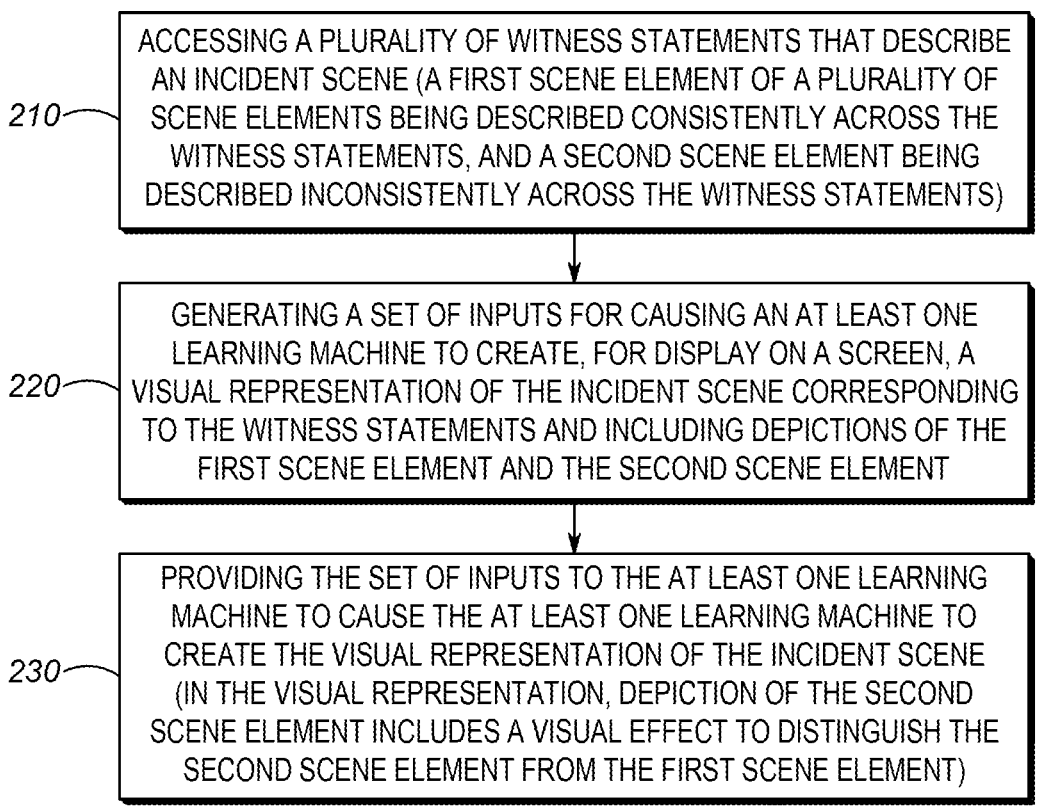
FIG. 2 is a flow chart illustrating a computer-implemented method in accordance with an example embodiment.
Figure 3:
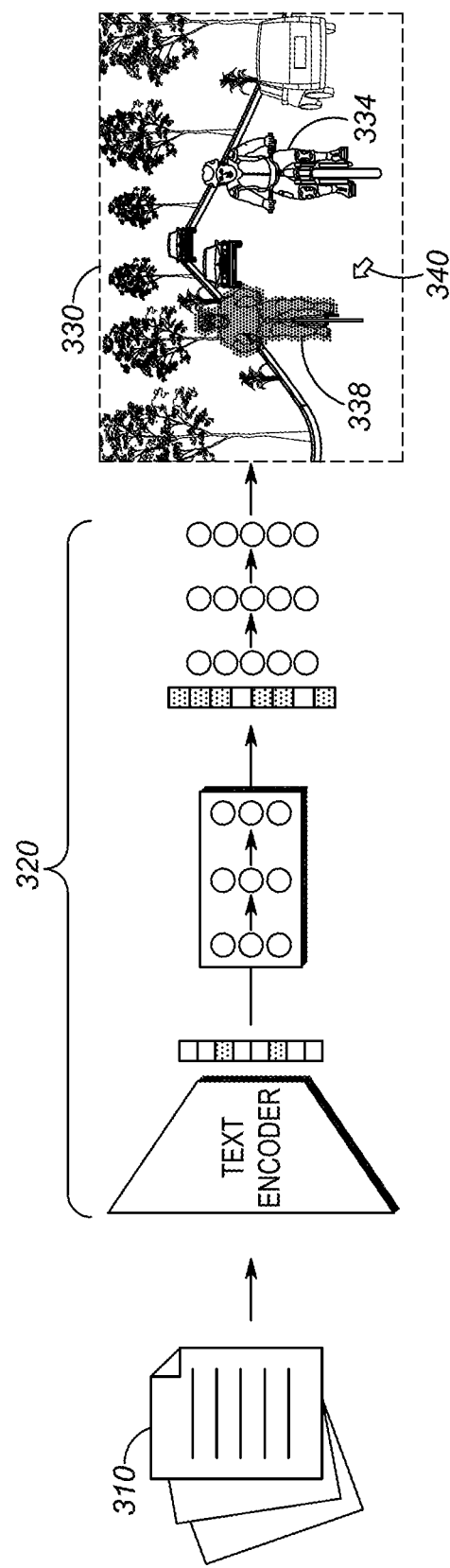
FIG. 3 is a block diagram of input to and output from an at least one learning machine employed in some examples of the computer-implemented method of FIG. 2.

Continuing on, reference is now made to FIGS. 2 and 3. FIG. 2 is a flow chart illustrating a method 200 in accordance with an example embodiment. FIG. 3 is a block diagram of input to and output from an at least one learning machine 320 employed in some examples of the computer-implemented method of FIG. 2.

In FIG. 2, the illustrated method 200 includes accessing (210) a plurality of witness statements that describe an incident scene that includes a plurality of scene elements. (A first scene element 334 of the scene elements, shown in FIG. 3, is described consistently across the witness statements, and a second scene element 338 of the scene elements is described inconsistently across the witness statements.) In carrying out the action 210, the processor 112 (FIG. 1) may, in some examples, be employed.

It will be understood that while in FIG. 3 the scene elements 334 and 338 are, for convenience of illustration, people on bicycles, other moving (non-fixedly located) scene elements are contemplated. Examples of other moving scene elements include people without bicycles, vehicles, etc.

Next, the method 200 of FIG. 2 includes generating (220) a set of inputs 310, which are for causing the at least one learning machine 320 to create, for display on a screen, a visual representation of the incident scene 330 corresponding to the witness statements and including depictions of the first scene element 334 and the second scene element 338. In some examples, the processor 112 (FIG. 1) may be used in carrying out the action 220.

Next, the method 200 of FIG. 2 includes providing (230) the set of inputs 310 to the at least one learning machine 320 to cause the at least one learning machine 320 to create the visual representation of the incident scene 330. In some examples, the at least one learning machine 320 may be embodied in an at least one text-to-image model (or embodied in an at least one text-to-video model). As will be appreciated by those skilled in the art, commercially available examples of such models include DALL-E™, Picsart™, Midjourney™, Veed.io™, etc. In some examples, it is contemplated that the at least one learning machine 320 may reside either on a client device, or alternatively on a remote server (for example, in the cloud).

The visual representation of the incident scene 330 can take the form of just one media work, that is generated by the image creation application 145, and where both the consistent and inconsistent scene elements are combined together in the one media work. Alternatively, it is further contemplated that the image creation application 145 may also generate additional media works, and that such additional media works are depicting just subsets of witness statements (scene element-differentiating visual effects are not included in these additional media works). It is also contemplated that one or more of these additional media works can be derived from a previously generated media work (for example, a first additional media work may be generated from a first witness statement, and then afterwards a second additional media work is generated by difference-targeted modification of the first additional media work that was generated from the first witness statement).

Continuing on, it will be noted that the depiction of the second scene element 338 includes a visual effect (for example, blurring of this element as shown in FIG. 3 to distinguish it from the non-blurred second scene element 338) based on the first scene element 334 being consistently described across the witness statements, as contrasted to the second scene element 338 being inconsistently described across the witness statements.

The visual representation of the incident scene on may be displayed on a screen (for example, the display 126 shown in FIG. 1) along with a plurality of additional elements of a Graphical User Interface (GUI) including, for example, a cursor element 340. In some examples, based on received user input the cursor element 340 may be moved within the GUI. For instance, it is contemplated that the cursor element 340 could be moved onto the second scene element 338 and then, based on further user input, there could be effected a change of a state of the second scene element's visual effect from the illustrated blurred state to a non-blurred state (other contemplated changes of state include, for example, a change from a translucent or outlined state to a solid state, a change from a blended color state to a non-blended color state, a change from a transitioning loop state to a non-transitioning state, etcetera). In one example where the second scene element's visual effect is the transitioning loop state, it is contemplated that the second scene element may be included in the visual representation in the form of an animation graphic.

Other user input-driven actions for the cursor element 340 are contemplated such as, for example, receiving cursor-clicking user input to cause text corresponding to statement details for the second scene element 338 to appear on the screen. (In at least one example, the text corresponding to the statement details may include a portion that highlights conflicting aspects in relation to the statement details.) Also, it will be understood that other types of selectors besides a cursor element are contemplated. For example, the selector may be a touchscreen-based selector (i.e. a selector that is actuated by way of the display 126 being touched).

In some examples, each of a plurality of permutations of descriptions for the second scene element 338 are assigned a respective correctness likelihood (for instance, the image creation application 145 may include an artificial intelligence bot to facilitate scoring/ranking of description conclusiveness). Also, it is contemplated that the depiction of the second scene element 338 may, for example, visually reflect all of the permutations of the descriptions in proportioned amounts based on the correctness likelihoods of the permutations of the descriptions.

Consistent with the above-described examples, a correctness likelihood of one of the permutations of the descriptions may be visually reflected based on an amount or degree of at least one of a blurring, a transparency level, and a sub-interval presentation duration in a transitioning loop state of the visual effect of the depiction of the second scene element 338. Also, it will be appreciated that not every statement (or portions of statements) made by a particular witness need necessarily be given equal weighting of correctness. Examples of factors that could lower or raise a particular weighting of correctness include confidence-relevant witness words (for instance, "I'm not sure" or "I'm absolutely sure"), trustworthiness of the witness (e.g. extent and nature of the witness' criminal history), witness distance from a focal point of the incident, witness' impairment/non-impairment, degree of witness' vision deficiency, etcetera.

In at least one example, the method 200 may further include providing video (captured contemporaneous with incident occurrence at the incident scene) to the at least one learning machine 320 in order to enhance the visual representation of the incident scene. Also, it is contemplated that one or more scene elements (for example, the first scene element 334) may be shown as a moving object within such video.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot create a visual representation for display on a screen, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method comprising:
    employing at least one processor to access a plurality of witness statements that describe an incident scene that includes a plurality of scene elements, a first scene element of the scene elements being described consistently across the witness statements, and a second scene element of the scene elements being described inconsistently across the witness statements;
    generating, using the at least one processor, a set of inputs for causing an at least one learning machine to create, for display on a screen, a visual representation of the incident scene corresponding to the witness statements and including depictions of the first scene element and the second scene element; and
    providing the set of inputs to the at least one learning machine to cause the at least one learning machine to create the visual representation of the incident scene,
    wherein:
    the depiction of the second scene element includes a visual effect to distinguish the second scene element from the first scene element based on the first scene element being consistently described across the witness statements, as contrasted to the second scene element being inconsistently described across the witness statements, and
    the first scene element is a person or a vehicle, and the second scene element is a different person or a different vehicle than the person or the vehicle respectively.

2. The computer-implemented method of claim 1 further comprising:
    displaying the visual representation of the incident scene on the screen along with a plurality of additional elements of a Graphical User Interface (GUI), the additional elements including a cursor element; and
    receiving user input to cause the cursor element to be moved within the GUI and onto the second scene element.

3. The computer-implemented method of claim 2 further comprising receiving further user input to cause a change of a state of the visual effect from: i) a blurred state to a non-blurred state; ii) a translucent or outlined state to a solid state; or iii) a transitioning loop state to a non-transitioning state.

4. The computer-implemented method of claim 2 further comprising receiving cursor-clicking user input to cause text corresponding to statement details for the second scene element to appear on the screen.

5. The computer-implemented method of claim 4 wherein the text corresponding to the statement details includes a portion that highlights conflicting aspects in relation to the statement details.

6. The computer-implemented method of claim 1 wherein each of a plurality of permutations of descriptions for the second scene element are assigned a respective correctness likelihood, and the depiction of the second scene element visually reflects all of the permutations of the descriptions in proportioned amounts based on the correctness likelihoods of the permutations of the descriptions.

7. The computer-implemented method of claim 6 wherein a correctness likelihood of one of the permutations of the descriptions is visually reflected based on an amount or degree of at least one of a blurring, a transparency level, and a sub-interval presentation duration in a transitioning loop state of the visual effect of the depiction of the second scene element.

8. The computer-implemented method of claim 1 further comprising displaying the visual representation of the incident scene, including the scene elements, on the screen, wherein the second scene element is included in the visual representation in a form of an animation graphic having a transitioning loop state.

9. The computer-implemented method of claim 1 further comprising providing video captured contemporaneous with incident occurrence at the incident scene, to the at least one learning machine, in order to enhance the visual representation of the incident scene.

10. The computer-implemented method of claim 9 wherein the first scene element is shown as a moving object within the video.

11. A system comprising:
  at least one processor;
  a display screen communicatively coupled to the at least one processor; and
  at least one electronic storage medium communicatively coupled to the at least one processor, and the at least one electronic storage medium storing program instructions that when executed by the at least one processor cause the at least one processor to perform:
  accessing a plurality of witness statements that describe an incident scene that includes a plurality of scene elements, a first scene element of the scene elements being described consistently across the witness statements, and a second scene element of the scene elements being described inconsistently across the witness statements;
  generating a set of inputs for causing an at least one learning machine to create, for display on the display screen, a visual representation of the incident scene corresponding to the witness statements and including depictions of the first scene element and the second scene element; and
  providing the set of inputs to the at least one learning machine to cause the at least one learning machine to create the visual representation of the incident scene, wherein:
    the depiction of the second scene element includes a visual effect to distinguish the second scene element from the first scene element based on the first scene element being consistently described across the witness statements, as contrasted to the second scene element being inconsistently described across the witness statements, and
    the first scene element is a person or a vehicle, and the second scene element is a different person or a different vehicle than the person or the vehicle respectively.

12. The system of claim 11 wherein the display screen is further configured to display the visual representation of the incident scene on the screen along with a plurality of additional elements of a Graphical User Interface (GUI), the additional elements including a cursor element, and the system being configured to receive user input to cause the cursor element to be moved within the GUI and onto the second scene element.

13. The system of claim 12 wherein further user input receivable by the system causes a change of a state of the visual effect from:
  i) a blurred state to a non-blurred state;
  ii) a translucent or outlined state to a solid state; or
  iii) a transitioning loop state to a non-transitioning state.

14. The system of claim 11 wherein each of a plurality of permutations of descriptions for the second scene element are assigned a respective correctness likelihood, and the depiction of the second scene element visually reflects all of the permutations of the descriptions in proportioned amounts based on the correctness likelihoods of the permutations of the descriptions.

15. The system of claim 14 wherein a correctness likelihood of one of the permutations of the descriptions is visually reflected based on an amount or degree of at least one of a blurring, a transparency level, a color blending, and a sub-interval presentation duration in a transitioning loop state of the visual effect of the depiction of the second scene element.

16. The system of claim 11 wherein the display screen is configured to display the visual representation of the incident scene, including the scene elements, and the second scene element is included in the visual representation in a form of an animation graphic having a transitioning loop state.

17. The system of claim 11 execution of the program instructions by the at least one processor further causes providing video captured contemporaneous with incident occurrence at the incident scene, to the at least one learning machine, in order to enhance the visual representation of the incident scene.

18. The system of claim 17 wherein the first scene element is shown as a moving object within the video.

* * * * *